United States Patent [19]

Inagaki et al.

[11] Patent Number: 4,646,519
[45] Date of Patent: Mar. 3, 1987

[54] CLUTCH PRESSURE MODULATOR VALVE DEVICE

[75] Inventors: Toshiyuki Inagaki, Kariya; Choji Furusawa, Okazaki, both of Japan

[73] Assignee: Aisin Seiki Kabushiki Kaisha, Kariya, Japan

[21] Appl. No.: 708,895

[22] Filed: Mar. 6, 1985

[30] Foreign Application Priority Data

Mar. 30, 1984 [JP] Japan .................. 59-61004

[51] Int. Cl.⁴ ............................. F16D 25/12
[52] U.S. Cl. ................... 60/416; 192/85 R
[58] Field of Search ............ 60/416, 413; 192/85 R

[56] References Cited

U.S. PATENT DOCUMENTS

| 2,935,999 | 5/1960 | Hock et al. | 192/85 R X |
| 3,025,717 | 3/1962 | Christenson | 192/85 R X |
| 3,458,999 | 8/1969 | Reis | 60/416 |

FOREIGN PATENT DOCUMENTS

| 933186 | 2/1956 | Fed. Rep. of Germany | 192/85 R |
| 1167193 | 4/1964 | Fed. Rep. of Germany | 192/85 R |

*Primary Examiner*—A. Michael Chambers
*Assistant Examiner*—John C. Fox
*Attorney, Agent, or Firm*—Oblon, Fisher, Spivak, McClelland & Maier

[57] ABSTRACT

A clutch pressure modulator valve device for controlling pressure applied to a clutch of power transmission, the device including an accumulator chamber and a secondary accumulator chamber communicated with the accumulator chamber. The secondary accumulator chamber is formed so as to change the maximum expansive volume thereof by operation of an operating member disposed exterior of the power transmission whereby the modulating characteristic of the clutch pressure is adjustable to a desired value.

6 Claims, 4 Drawing Figures

CLUTCH PRESSURE MODULATOR VALVE DEVICE

BACKGROUND OF THE INVENTION

1. Field of the Invention:

This invention relates generally to a clutch pressure modulator valve device and more specifically to a clutch pressure modulator valve for modulating the clutch pressure applied to a fluid pressure operated clutch of power transmission of a particular motorized vehicle, for example a fork lift.

2. Description of the Prior Art:

In a conventional clutch pressure modulator valve device, the valve device comprises a piston disposed in an accumulator chamber for accumulating oil pressure operating a clutch of a power transmission and a relief port for transmitting a part of the pressurized oil in the accumulator chamber to an oil reservoir upon movement of the piston, whereby the oil pressure operating clutch in the accumulator chamber increases along a gradual pressure gradient to a predetermined value. Subsequently, communication between the accumulator chamber and the relief port is cut off by movement of the piston after the oil pressure in the accumulator chamber applied to operating clutch is increased to the predetermined value. In this type of valve, however, the effective diameter of the relief port for determining the pressure gradient of the modulating characteristic of the oil pressure is fixed as to its general value and cannot be controlled from the exterior of the power transmission. Although it is desirable that the modulating characteristic of the pressure gradient of the modulator valve changes in response to an operating condition or load condition of the vehicle in order to operate the clutch under an optimum pressure gradient by, for example, changing a spring force biasing the piston, the volume of accumulator chamber or the flow rate of oil into the accumulator chamber. As a result, this can cause a shock to be generated due to the sudden engagement of the clutch when the vehicle is under a light load due to too steep a pressure gradient modulating characteristic or can cause an increase in time lag of clutch operation when the vehicle is under a heavy load due to too gradual a pressure gradient modulating characteristic.

SUMMARY OF THE INVENTION

It is an object of the present invention to avoid the aforementioned and other disadvantages of a conventional clutch pressure modulator valve device.

More particularly, an object of the present invention is to provide an improved clutch pressure modulator valve device which can select the modulating characteristics in response to the operating condition or the load condition in a vehicle.

Another object of the present invention is to provide a clutch pressure modulator valve device which can allow for easy adjustment of the modulating characteristic from the exterior of the power transmission.

These and other objects are accomplished by the clutch pressure modulator valve of the present invention comprising a modulator valve having an accumulator chamber and a piston disposed within the accumulator chamber, a secondary accumulator chamber for changing the maximum expansive volume thereof and communicating with the accumulator chamber, and an operating member for changing the maximum expansive volume of the secondary accumulator chamber from the exterior of the power transmission.

Consequently, in the present invention, for example, when the vehicle is under a heavy load, the time lag of clutch operation is decreased to the minimum valve without causing a shock to occur upon clutch engagement due to the existence of a steep pressure gradient by which the decreased volume of the secondary accumulator chamber operated by the operating member. Moreover, when the vehicle is under a light load the clutch is prevented from generating a shock upon being engaged due to the gradual pressure gradient resulting from the increased volume of secondary accumulator chamber operated by the operating member.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
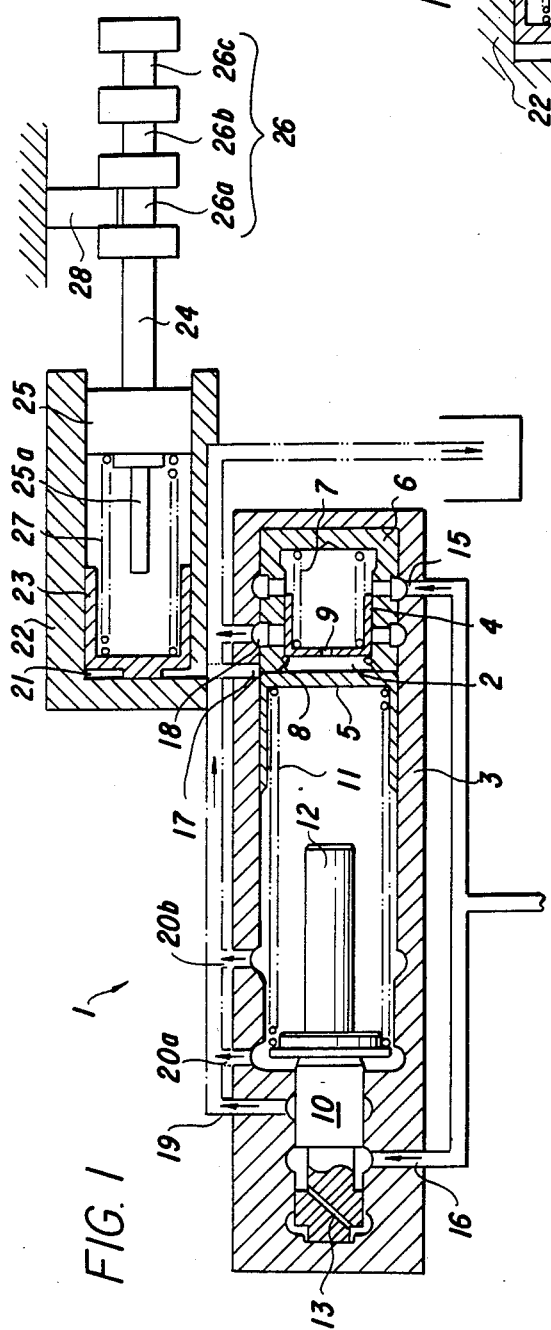
FIG. 1 is a cross-sectional view of a clutch pressure modulator valve device according to the first embodiment of the present invention.

As shown in FIG. 1, a clutch pressure modulator valve device 1 comprises a cylinder 3 having an accumulator chamber 2 defined by a piston 4 disposed in cylinder 3 and a piston 5 slidably fitted in cylinder 3 and opposed to the piston 4. The diameter of piston 4 is smaller than that of piston 5. Piston 4 is slidably fitted within a core 6 which is in turn fixed within the cylinder 3. The piston 4 is biased in the direction of piston 5 by a spring 7 disposed between one end and core 6 and is limited in the working stroke thereof by a snap ring 8 fixed to core 6. An orifice 9 for transmitting oil from within core 6 into the accumulator chamber 2 is formed on a crown portion of piston 4.

The piston 5 is biased in the direction of piston 4 by a spring 11 disposed between one end thereof and a spool 10 slidably fitted in cylinder 3, and is limited in the working stroke thereof by an end surface of core 6. The return stroke of piston 5 is limited by an end portion of a rod 12 which extends in the direction of piston 5 from spool 10. An oil passage 13 is formed in spool 10 in order to create a back pressure between cylinder 3 and spool 10. A port 15 for transmitting oil into core 6 from an oil pump 14, a port 16 for creating back pressure to spool 10, a port 17 for communicating accumulator chamber 2 with a secondary accumulator chamber 21 installed in an exterior portion of cylinder 3, a drain port 18, and ports 19, 20a and 20b for passage of oil are formed in cylinder 3.

The secondary accumulator chamber 21 is formed within a secondary cylinder 22 positioned exterior of cylinder 3 and a secondary piston 23 is slidably fitted in cylinder 22. A rod 24 for limiting the return stroke of secondary piston 23 is positioned adjacent secondary piston 23. A land 25 is fitted within secondary cylinder 22 and includes a projection 25a extending therefrom. A plurality of grooves 26 (26a, 26b, 26c) for limiting the position of a rod 24 extending from land 25a are formed on rod 24.

The secondary piston 23 is biased in the direction of decreasing the volume of secondary accumulator chamber 21 by a spring 27 disposed between one end of piston 23 and land 25. A projecting member 28 fixed at a prescribed positioned exterior to power transmission 32 is selectively engaged with one of the plurality of grooves 26a, 26b, and 26c.

Figure 2:
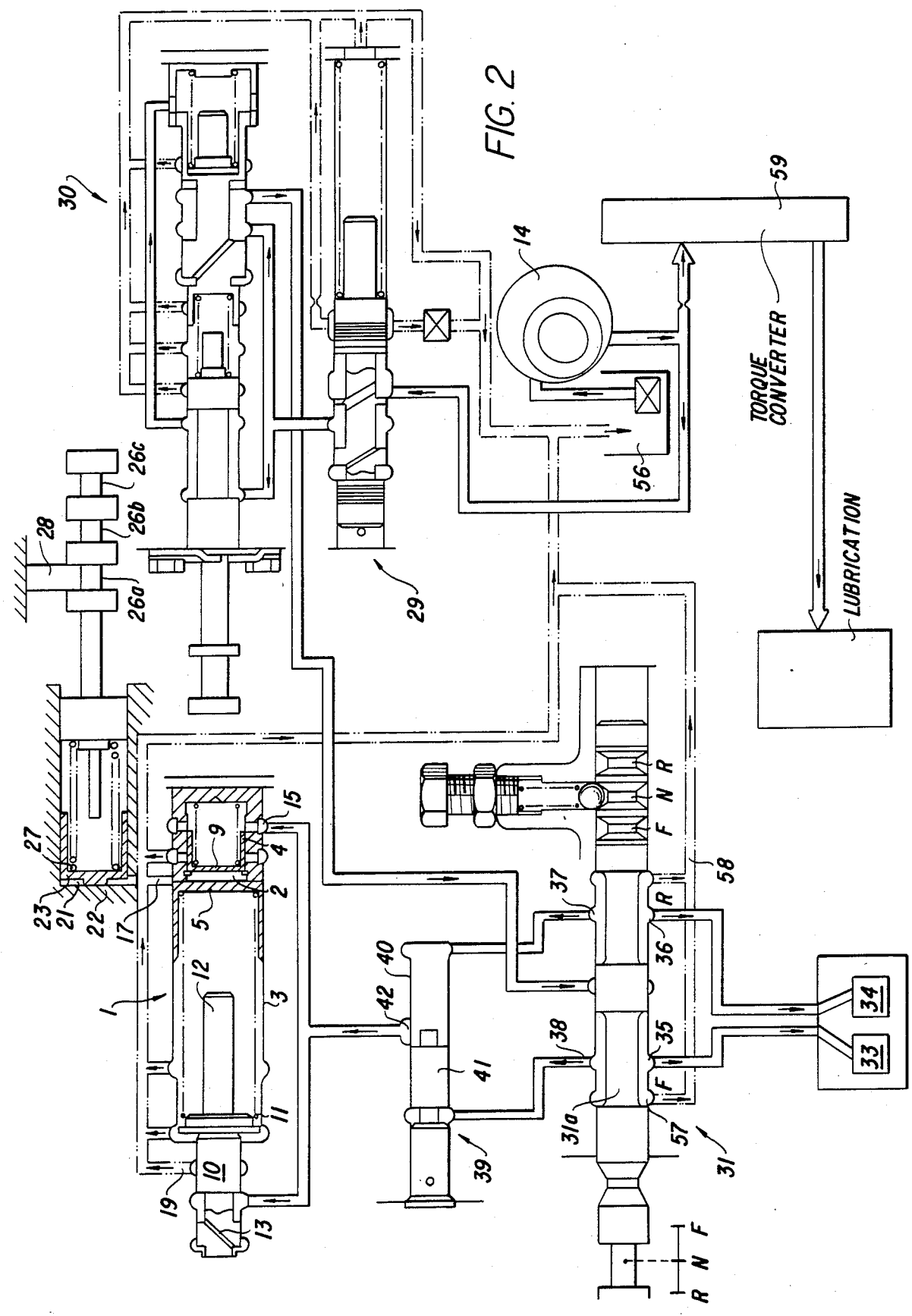
FIG. 2 is a diagram of an oil pressure circuit of a folk lift equipped with the clutch pressure modulator valve device of FIG. 1.

As shown in FIG. 2, operating oil from the oil pump 14 is introduced into a selector valve 31 via a regulator valve 29 and an pressure adjustment valve 30 along the passage of its oil pressure circuit. The selector valve 31 selectively communicates oil pressure to a forward clutch 33 or a reverse clutch 34 and oil passages 35 and 36 thereof are communicated with a power transmission 32. Oil passages 37 and 38 communicate with oil passages 35 and 36, respectively, and are also connected with opposite ends of a change valve 39.

Change valve 39 is operated upon movement of a piston 41 slidably fitted in a cylinder 40 of change valve 39 by which piston 41 is moved by back pressure existing in oil passages 37 and 38. The oil pressure in change valve 39 is introduced to port 15 of clutch pressure modulator valve device 1 via a port 42 formed in change valve 39.

The operating oil pressurized by oil pump 14 is regulated by regulator valve 29 and is then introduced into pressure adjustment valve 30. When pressure adjustment valve 30 is not being operated, the operating oil is introduced into selector valve 31 without decreasing the pressure within pressure adjustment valve 30. When the selector valve 31 is in a neutral position as shown in FIG. 2, communication with port 15 through change valve 39 is cut off. When the selector valve 31 is shifted to the right to the forward position F and thus a spool 31a of selector valve 31 is shifted in a rightward direction, the operating oil is introduced into forward clutch 33 of power transmission 32 through oil passage 35 and change valve 39 via passage 38, and then the operating oil is introduced to the port 15 through a port 42 of change valve 39 by which piston 41 of change valve 39 is shifted. The operating oil then acts on the piston 5 via port 15 and orifice 9 of piston 4. The piston 4 which is biased by spring 11 does not move until the operating oil pressure overcomes the initial load of spring 11. During this situation, the operating oil pressure is introduced into forward clutch 33 and rapidly increases to a predetermined value. The operating oil further acts upstream of spool 10 via oil passage 13, whereby spool 10 moves in the direction of piston 5. When excess pressure is created upstream of spool 10, the result is that the operating oil is drained from port 19.

When the pressure of the operating oil overcomes the initial load of spring 11, the piston 5 moves in a leftward direction, whereby the accumulator chamber 2 communicates with the secondary accumulator chamber 22 via port 17, the operating oil is introduced into the secondary accumulator chamber 21 and thus the secondary piston 23 moves in a rightward direction against the biasing force of spring 27. After the operating oil is introduced into the secondary accumulator chamber 21, the pressure gradient changes from a steep characteristic to a gradual characteristic. This gradual pressure gradient thus acts on the oil pressure communicated to the forward clutch 33. The forward clutch 33 changes to a fully-engaged condition from a half-engaged condition in response to increasing pressure of this gradual pressure gradient.

When the piston 5 and the secondary piston 23 move to the position contacting rod 12 and projection 25a, respectively, the pressure gradient of the operating oil changes from a gradual characteristic to a steep characteristic. The rotational torque of torque converter 59 is transmitted to the forward clutch 33 by such operation, whereby the vehicle is forwardly propelled.

Next, when the selector valve 31 is changed to the neutral position from the forward position F as shown in FIG. 2, the operating oil in the forward clutch 33, accumulator chamber 2 and secondary accumulator chamber 21 is drained to an oil reservoir 56 via a drain port formed in selector valve 31 and a passage 58 whereby the forward clutch 33 is released from an engaged condition and changes to the neutral condition.

Next, when the selector valve 31 is changed to the reverse position R from the neutral position, the operating oil is introduced into the reverse clutch 34 through passage 36. At the same time, the operating oil is introduced into the change valve 39 through passage 37, then introduced into the port 15 via port 42 such that the piston 41 moves in the leftward direction by pressure applied to change valve 39 so as to communicate passage 37 with port 42. Operation after this step is similar to that when the selector valve 31 is changed to the forward position F.

As shown in FIG. 1, the maximum expansive volume of secondary accumulator chamber 21 is set to the uppermost limit by engagement between projecting member 28 and groove 26a. The maximum expansive volume that secondary accumulator chamber 21 can be adjusted to a desired value obtained when the engagement between projecting member 28 and groove 26a is released. A lesser expansive volume of chamber 21 is obtained when projection 25a extends into secondary cylinder 22 such that groove 26b or groove 26c engages with projecting member 28. Accordingly, due to projecting member 28, the position of rod 24 is fixed. By such movement of rod 24 and projection 25a, the maximum expansive volume of secondary accumulator chamber 21 is decreased whereby the pressure gradient of the operating oil changes to be steeper, resulting in the time lag of clutch operation decreasing when the acting torque to clutch 33 or clutch 34 is relatively large.

Figure 3:
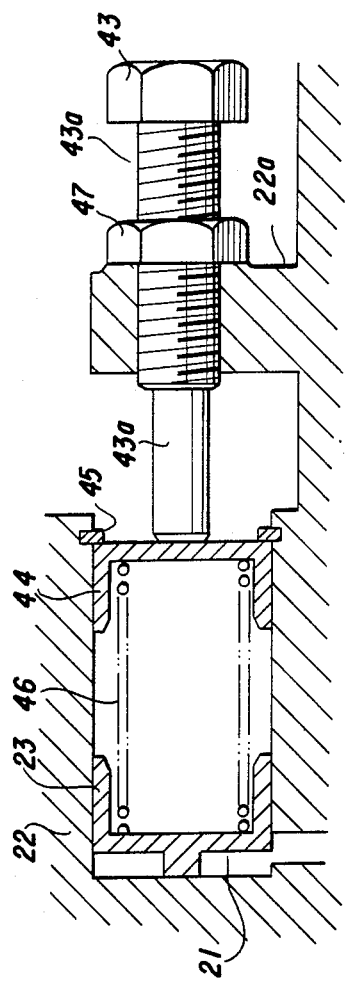
FIG. 3 is a cross-sectional view of the clutch pressure modulator valve device according to the second embodiment of the present invention.

In the second embodiment as shown in FIG. 3, the secondary accumulator chamber 21 includes secondary cylinder 22 and secondary piston 23. To one side of secondary cylinder 22, a bolt 43 having a threaded part 43a, 43a for limiting the maximum expansive volume of secondary accumulator chamber 21 is fastened to a stationary member 22a positioned exterior of power transmission 32. A piston 44 opposed to the secondary piston 23 is slidably fitted in the secondary cylinder 22 and abuts with one end of bolt 43. A snap ring 45 disposed in secondary cylinder 22 prevents the piston 44 from being removed from secondary cylinder 22. A spring 46 is disposed between secondary piston 23 and piston 44. The movement of bolt 43 is fixed by a locking nut 47.

When the pressure of the operating oil acting on the secondary piston 23 overcomes the initial load of spring 46, spring 46 is depressed whereby the secondary piston 24 moves in a rightward direction and the operating oil is introduced into the secondary accumulator chamber 21. The movement of secondary piston 23 in a rightward direction in response to an increase in pressure of operating oil is limited by engagement of the secondary piston 23 and the piston 44. The limit of movement of secondary piston 23 in a rightward direction can be adjusted by loosening locking nut 47 and then screwing the bolt 43 in the direction of piston 44 so as to move the piston 44 in a leftward direction. Fixing of bolt 43 is accomplished by screwing of locking nut 47 so as to engage stationary member 22a. According to the second embodiment, the maximum expansive volume of secondary accumulator chamber 21 can change linearly.

Figure 4:
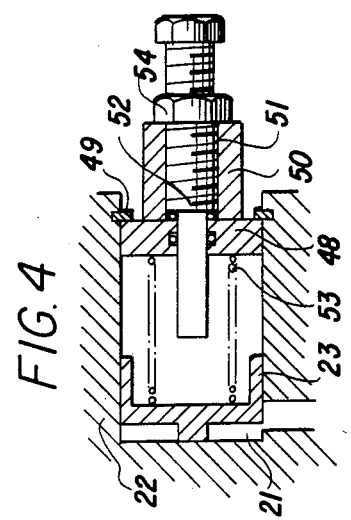
FIG. 4 is a cross-sectional view of the clutch pressure modulator valve device according to the third embodiment of the present invention.

In the third embodiment as shown in FIG. 4, the secondary accumulator chamber 21 is formed by secondary cylinder 22 and secondary piston 23. A piston 48 equipped with a rod 50 is disposed in the secondary cylinder 22. A snap ring 49 disposed in secondary cylinder 22 so as to prevent the piston 48 from being removed from secondary cylinder 22.

The exterior screw thread of a bolt 52 is engaged with an interior screw thread 51 formed on rod 50 of piston 48. A spring 53 biasing secondary piston 23 is disposed between secondary piston 23 and piston 48. Adjustment of the maximum expansive volume of secondary accumulator chamber 22 is accomplished by changing the position of bolt 52 engaged with interior screw thread 51. The position of bolt 52 is fixed by a locking nut 54.

According to the third embodiment as shown in FIG. 4, the maximum expansive volume of secondary accumulator chamber 21 can be changed without changing of the predetermined initial load of spring 53.

Obviously many modifications and variations of the invention are possible in light of the above teachings. It is therefore to be understood that within the scope of the appended claims, the invention may be practiced otherwise than as specifically decribed herein.

What is claimed as new and desired to be secured by Letters Patent of the United States is:

1. A clutch pressure modulator valve device for a clutch of a power transmission, comprising:
    a first accumulator having a first chamber for controlling pressure applied to said clutch;
    a second accumulator having a second chamber communicated with said first chamber and having a maximum expansive volume; and
    means connected to said second accumulator and positioned exterior of said power transmission for adjusting said maximum expansive volume of said second chamber;
    wherein said second accumulator further comprises a cylinder, a piston slidably fitted in said cylinder and a spring positioned in said cylinder for biasing said piston;
    said means for adjusting said maximum expansive volume of said second accumulator further comprises a first member for limiting the final position of a working stroke of said piston and a second member for fixing said first member at a desired position;
    said spring is positioned between said piston and said first member within said cylinder and is retained on said first member at one end of said spring; and
    wherein said first member further comprises a projection extending towards said piston for limiting a final position of a working stroke of said piston.

2. A clutch pressure modulator valve device according to claim 1, wherein said second member further comprises a member projecting from said power transmission.

3. A clutch pressure modulator valve device according to claim 1, wherein said second member further comprises a locking nut.

4. A clutch pressure modulator valve device according to claim 1, wherein said first member further comprises a rod which extends into said cylinder.

5. A clutch pressure modulator valve device according to claim 1, wherein said first member further comprises a rod which extends into said cylinder and said second member further comprises a member projecting from said power transmission.

6. A clutch pressure modulator valve device for a clutch of a power transmission, comprising:
    a first accumulator having a first chamber for controlling pressure applied to said clutch;
    a second accumulator having a second chamber communicated with said first chamber and having a maximum expansive volume; and
    means connected to said second accumulator and positioned exterior of said power transmission for adjusting said maximum expansive volume of said second chamber;
    wherein said second accumulator further comprises a cylinder, a first piston slidably fitted in said cylinder and a spring positioned in said cylinder for biasing said first piston;
    said means for adjusting said maxium expansive volume of said second accumulator further comprises a first member for limiting the final position of a working stroke of said first piston and a second member for fixing said first member at a desired position;
    said spring is positioned between said first piston and said first member within said cylinder and abuts said first member at one end of said spring; and
    wherein said first member further comprises a second piston.

* * * * *